(12) United States Patent
Ellis

(10) Patent No.: US 9,687,754 B2
(45) Date of Patent: *Jun. 27, 2017

(54) APPARATUS FOR EXTRACTING OIL FROM OIL-BEARING PLANTS

(71) Applicant: Matthew Ellis, Littleton, CO (US)

(72) Inventor: Matthew Ellis, Littleton, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/190,977

(22) Filed: Jun. 23, 2016

(65) Prior Publication Data

US 2016/0303490 A1   Oct. 20, 2016

Related U.S. Application Data

(63) Continuation-in-part of application No. 14/470,494, filed on Aug. 27, 2014, now Pat. No. 9,399,180, which is a continuation-in-part of application No. 13/734,915, filed on Jan. 4, 2013, now abandoned.

(51) Int. Cl.
*B01D 11/02* (2006.01)
*C11B 1/10* (2006.01)
*B01D 11/00* (2006.01)

(52) U.S. Cl.
CPC ...... *B01D 11/0207* (2013.01); *B01D 11/0203* (2013.01); *B01D 11/028* (2013.01); *B01D 11/0215* (2013.01); *B01D 11/0292* (2013.01); *C11B 1/10* (2013.01); *B01D 11/00* (2013.01); *B01D 2011/007* (2013.01)

(58) Field of Classification Search
CPC . B01D 11/0207; B01D 11/00; B01D 11/0292; B01D 2011/007

USPC ................................................. 422/119, 281
See application file for complete search history.

(56) References Cited

U.S. PATENT DOCUMENTS

| 5,516,923 A | 5/1996 | Hebert et al. |
|---|---|---|
| 7,002,029 B2 | 2/2006 | Davis |
| 9,399,180 B2 * | 7/2016 | Ellis ................... B01D 11/0207 |
| 2003/0077367 A1 | 4/2003 | Trout |
| 2009/0028971 A1 | 1/2009 | Wiesmuller et al. |
| 2011/0100894 A1 | 5/2011 | Miller |
| 2011/0133120 A1 | 6/2011 | McGhee |

* cited by examiner

*Primary Examiner* — Lyle Alexander
*Assistant Examiner* — Bryan Kilpatrick
(74) *Attorney, Agent, or Firm* — Keaty Law Firm LLC

(57) ABSTRACT

A system for extracting oil from oil-bearing plant parts has an extraction vessel supported by an upright stand, a separator vessel mounted below the extraction vessel, and an expansion filter vessel mounted downstream from the separator vessel. A source of hydrocarbon solvent supplies liquid gas to the top of the extraction vessel, while a recycling pump connected to the separator vessel facilitates transport of the solvent through the plant material in the extraction vessel. The solvent is recovered and re-circulated, while extracted oil is removed from the separator. A computer-based temperature control assembly having a cooling device and a jacketed injection coil regulates temperature of the solvent delivered to the extraction assembly. A thermal jacket is mounted on each of the separator vessel and the expansion filter vessel, with the thermal jackets supplying heat and cold to the interior of the separator vessel and the expansion filter vessel and helping evaporate and condense the solvent.

11 Claims, 3 Drawing Sheets

APPARATUS FOR EXTRACTING OIL FROM OIL-BEARING PLANTS

CROSS-REFERENCE TO RELATED APPLICATIONS

This application is a continuation-in-part of my application Ser. No. 14/470,494, filed Aug. 27, 2014, titled "An Apparatus for Extracting Oil from Oil-Bearing Plant Material," which is a continuation-in-part of application Ser. No. 13/734,915, filed Jan. 4, 2013 for "An Apparatus for Extracting Oil from Oil-Bearing Plant Material," now abandoned, the full disclosures of which are incorporated by reference herein and priority of which is hereby claimed.

BACKGROUND OF THE INVENTION

This invention relates to an apparatus and method of extracting oil from oil bearing plant parts, and more particularly to an apparatus and method of extracting plant oil using a hydrocarbon solvent agent.

Plant oils have been extracted from plant material for centuries. Many plant oils are extracted from seeds by squeezing or crushing the seeds to force out the oil therefrom. Mechanical oil extractors or expellers are extensively used for obtaining cold-pressed oils where the temperature of starting material does not exceed 120-degrees Fahrenheit. In order to increase the oil output, the oil extraction methods provide for the addition of heat and pressure.

In addition, plant oils can be extracted with the assistance of a chemical agent or solvent, such as hexane. Chemical extraction is cheaper and more efficient than mechanical extraction, at a large scale, leaving only 0.5-0.7% of the oil in plant solids, as compared to the 6-14% of mechanical extraction.

Plant seeds and pods are not the only plant components that contain oil. Fibrous plant matter, including leaves, flowers, and so forth, contain significant amounts of plant oil that can be extracted and used in cosmetics, healthcare industries, and the like. Many solutions have been developed to provide plant oil extraction.

For instance, U.S. Pat. No. 5,516,923 discloses a method of plant oil extraction, according to which grounded plant material is deposited into a reactor vessel, and vacuum is created in the reactor vessel. Liquid solvent is introduced into the reactor vessel and allowed to contact the plant material for a time sufficient to dissolve oil from the plant material, while the temperature in the reactor vessel is maintained at a level which prevents denaturing of constituent components of the plant oil and the plant material. Additional solvent vapors are introduced into the bottom of the reactor to cause mixing of the plant material and the solvent and separate fine particulate matter from heavier particles. Pressurized heated solvent vapors are introduced into the top of the reactor vessel while the liquid solvent and oil combination is being removed from the bottom of the reactor vessel through filters. To prevent clogging of filters in the bottom of the reactor vessel, pressurized solvent vapors are forced through the filters into the bottom of the reactor vessel. The solvent and oil combination is transferred into a separator vessel, wherein the solvent is vaporized and removed for recycling, while the oil is removed into a holding tank.

U.S. Pat. No. 7,002,029 discloses a process for solvent extraction of oils, in an extraction chamber. According to this method, solvent mist with significant adiabatic cooling is introduced into the extraction chamber, whereby a pressure difference between the solvent inlet and outlet of the extraction chamber drives the solvent mist through the raw oil material. The solvent is fed to the extraction chamber at pressures exceeding the atmospheric pressure, and the outlet of the extraction chamber is subject to a partial vacuum.

U.S. Application Publication No. 2003/0077367 discloses a process and system for extracting a solute from oil-bearing foodstuffs. This design uses a tubular membrane filter to separate a mass of the extracting medium and the foodstuffs into a miscella and foodstuffs of reduced oil content. In a batch or continuous process, after each extracting stage, the mass from the extraction vessel is conveyed to a membrane filter, which has pores along its cylindrical walls suitably sized to allow a miscella to pass as the permeate, while causing the foodstuffs of reduced oil content to be conveyed axially along the tubes and out of its ends as the retentate. This apparatus uses a heating jacket to provide heat by steam, either directly or indirectly. However, the heating jacket of this publication does not supply heat and cold to the interior of the separator vessel and the expansion filter and help evaporate and condense the solvent.

U.S. Application Publication No. 2009/0028971 discloses a method utilizing compressed hydrocarbons. Residues from the crop and fruit treatment, especially from the treatment of pips and berries, are used as starting materials. The method is carried out without organic solvents, while applying low pressures and reduced extraction agent throughputs. Preferred extraction agents are ethane, propane, butane, and the mixtures thereof, with the extraction itself being carried out in batches at pressures of less than 50 mPa and temperatures of approximately 70-degrees Celsius, with an extraction agent throughput of between 4 and 20 kg/kg of starting materials.

U.S. Application Publication No. 2011/0133120 teaches a method of plant oil extraction, which provides for a hermetically first tank coupled to a first valve, the first tank for storing a solvent comprising butane, an extraction zone comprising an extraction chamber coupled between the first valve and a second valve, the extraction chamber having a filter proximate to the second valve; the extraction chamber having a volume between one-fourth and one-sixth of the volume of the first tank. A filter separates flowing butane solvent and plant oil from organic plant material in the extraction chamber. A second tank has an exit valve for removing plant oil located on a bottom portion of the second tank, and an exit valve located near a top portion of the second tank. However, this design provides for the use of filter only at the bottom of the extraction zone.

U.S. Application Publication No. 2011/0100894 teaches a plant oil extraction device that has a main body member with a hollow interior that receives a plant. A filter member is removably mounted on the main body and has a groove therein that receives glass frit. Thus, when a solvent is placed in the hollow interior with the plant, the glass frit filters the plant particulate, allowing plant oil and solvent to flow into a receiving vessel. Once the oil is collected, the filter member may be removed from the main body such that the glass frit can be cleaned of all plant particulate and be reused.

A commercially available example of an extraction distillation unit is a Tamisium Extractor manufacture by TmiE of Cleburne, Tex. This extractor utilizes several different single solvents, and sometimes co-solvents, a primary solvent and a carrier solvent; in total three distinct types of extractions.

While the designs discussed above may work satisfactorily in different environments, there is a need for an easyto-operate inexpensive apparatus for plant oil extraction that can be used in a non-industrial setting by a cosmetics laboratory, small shop, or consumer, without the need to mix solvents during an extraction process. During tests, it was also noted that the extraction process is made more efficient if the liquid material used to extract oil is maintained at a cooler temperature.

SUMMARY OF THE INVENTION

It is, therefore, an object of the present invention to provide an apparatus and method of plant oil extraction that is suitable for extracting oil from raw plant material with the assistance of a liquid solvent.

It is another object of the present invention to provide an apparatus and method of plant oil extraction that is suitable for extracting oil from raw plant material in a simple and inexpensive manner.

It is a further object of the invention to optimize the extraction process by controlling temperature of liquid solvent admitted into an extraction vessel.

These and other objects of the invention are achieved through a provision of a system for extracting oil from oil-bearing plant parts that has an extraction vessel supported by an upright stand and a separator vessel mounted below the extraction vessel. An expansion filter is mounted downstream of the separator vessel, filtering the solvent before it is re-circulated in the system. The system uses hydrocarbon solvent for extracting oil from the plant material.

The extraction vessel receives the oil-bearing plant material and liquid solvent, causing plant oil to be extracted from biomass loaded into the extractor vessel. The separator assembly, operationally connected to the extraction vessel, separates the hydrocarbon solvent from oil extracted in the extraction vessel. A computer-based temperature control assembly is operationally connected to a cooling device and the extraction vessel, allowing regulation of temperature of materials in the extraction vessel, and thereby optimizing oil extraction. A separator thermal jacket envelopes the separator vessel and receives heating medium therein, which causes vaporization of the solvent during the plant oil separation process.

The expansion filter vessel is similarly enveloped in a filter thermal jacket, which is configured to receive heated water and heat the contents of the expansion filter vessel. A solvent recovery assembly is operationally connected to the expansion filter assembly and the source of the hydrocarbon solvent, the solvent recovery assembly comprising gas recover/control unit being mounted between the expansion filter vessel and the gas tank.

An upright stand supports the extraction vessel, the separator vessel, and the expansion filter vessel. The upright stand has a plurality of leveling feet to facilitate positioning of the system in a workshop, laboratory, and similar settings.

BRIEF DESCRIPTION OF THE DRAWINGS

Reference will now be made to the drawings, wherein like parts are designated by like numerals, and wherein.

DETAILED DESCRIPTION OF THE INVENTION

Figure 1:
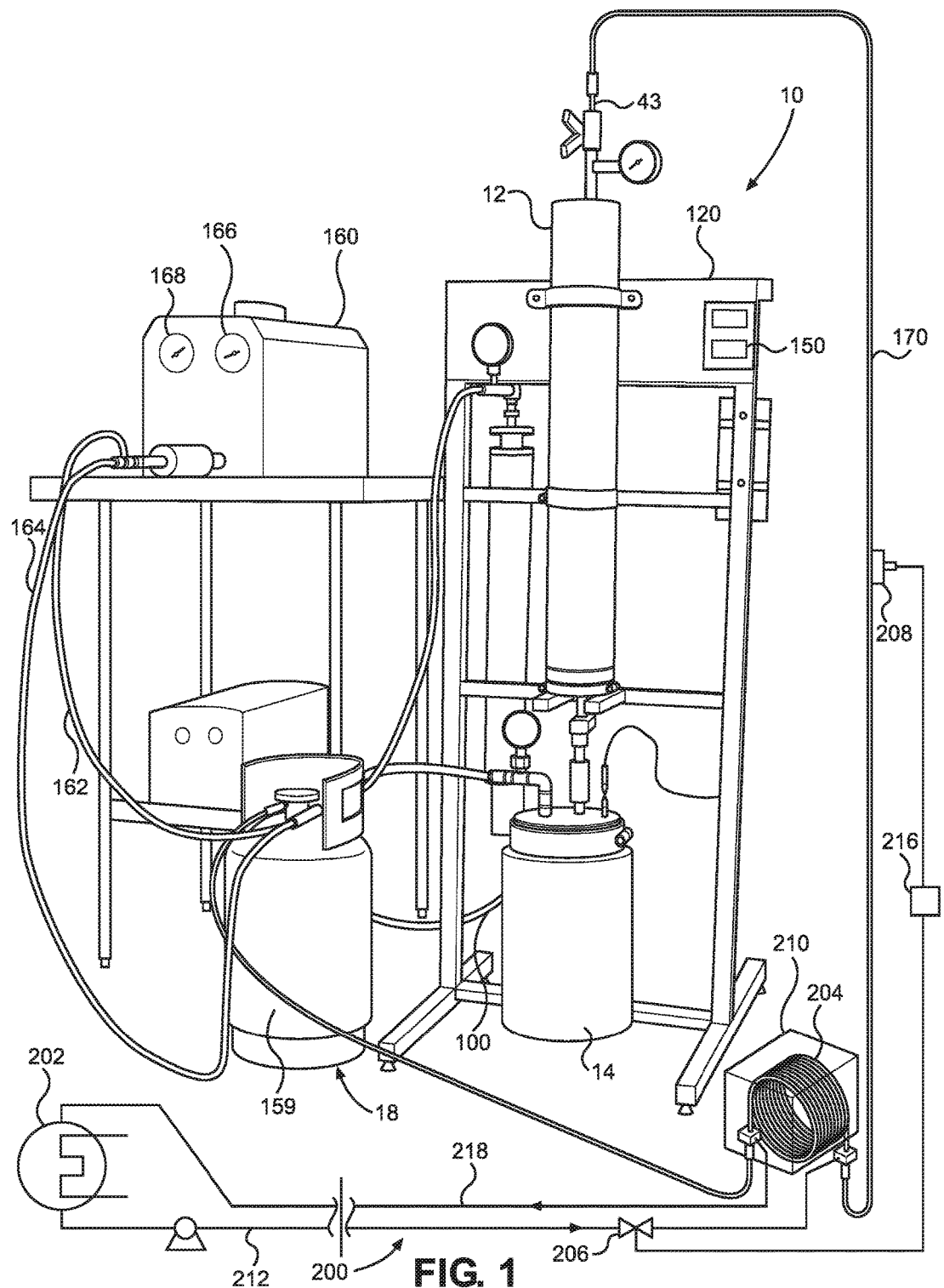
FIG. 1 is a schematic view of the extraction system according to the present invention.
Figure 2:
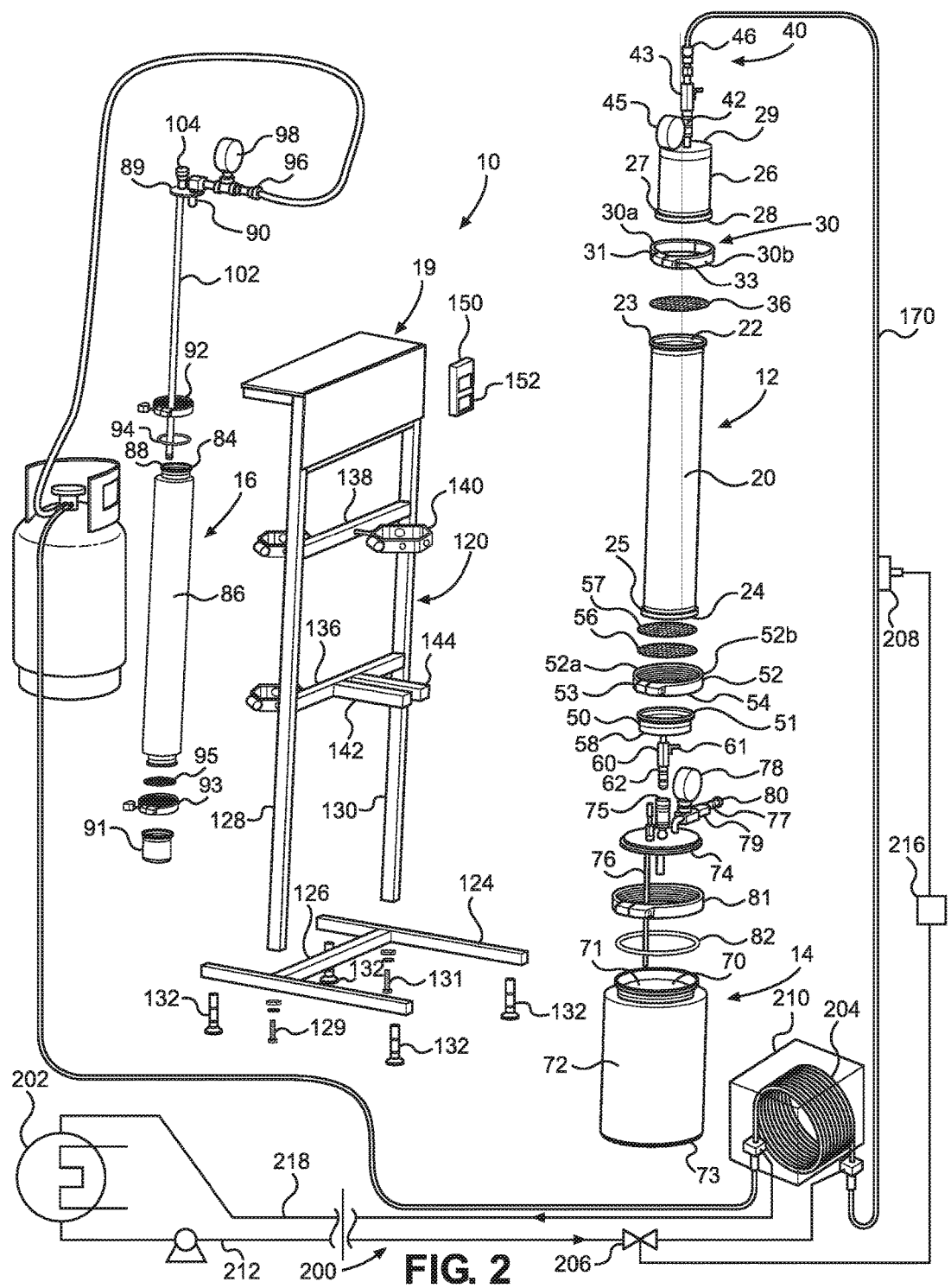
FIG. 2 is an exploded view of the major components of the extraction system according to the present invention.

Turning now to the drawings in more detail, numeral 10 designates the system of plant oil extraction according to this invention. The system 10 comprises an extraction assembly 12, a separator assembly 14, an expansion filter assembly 16, a solvent recovery assembly 18, and an upright support assembly 19, which supports the extraction assembly 12 and the expansion filter assembly 16. If desired, the support assembly 19 can also support the separator assembly 14.

The extraction assembly 12 comprises a tubular hollow extraction vessel 20 from having an open top 22 and an open bottom 24. A peripheral flange 23 extends outwardly from the open top 22. A similar peripheral flange 25 extends outwardly from the open bottom 24.

A top cup 26 normally detachably engages with the open top 22. The top cup has an open bottom 28 that matches the size and configuration of the top open end 22 of the extraction vessel 20. The top cup 26 is provided with a peripheral flange 27 that matches the top peripheral flange 23 of the extraction vessel 20. A two-piece top clamp member 30 having clamp members 30a and 30b secures the peripheral flanges 23 and 27 with the help of bolt 31 and nut/washer assembly 33.

A perforated gasket 36 is sandwiched between the bottom of the top cup 26 and the top open end 22 of the extraction vessel 20. The perforated gasket 36 allows the gas to atomize before saturating the biomass or plant material in the extraction vessel 20. The gasket 36 also prevents the biomass from moving upwardly into the top cup 26.

The top cup 26 has a closed top plate 29, which carries a connector assembly 40. The connector assembly 40 comprises an operationally connected, an extractor connector conduit 42, a gas inlet valve 43 fitted in the extractor connector conduit 42, and a pressure gauge 45 connected to the gas inlet valve 43. The top of the extractor connector conduit 42 is provided with a quick-connect male connector member 46. The inlet valve 43 can be a ball valve.

A bottom cup 50 is detachably secured to the bottom end 24 of the extraction vessel 20. The bottom cup 50 is provided with a matching peripheral flange 51 extending about an open upper edge of the bottom cup 50. The flange 51 of the bottom cup 50 is securable to the bottom peripheral flange 25 of the extraction vessel 20. A hinge clamp assembly 52 having clamp members 52a and 52b secures the flanges 25 and 51 with the bolt 53 and nut/washer assembly 54. In one aspect of the invention, the top cup 26 has longitudinal dimensions at least slightly greater, and preferably twice as great as the longitudinal dimensions of the bottom cup 50, allowing for more head space for the gas of the solvent to move into the extraction vessel 20.

A bottom perforated gasket 56 and a fine screen 57 are sandwiched between the bottom cup 50 and the bottom end 24 of the extraction vessel 20 in order to fine filter the extracted oil. The perforated gaskets 36 and 56 can be made of non-reactive metal, such as stainless steel, and the screen 57 can be a silk screen.

The bottom cup 50 is provided with a bottom plate 58, which closes the bottom of the bottom cup 50. A liquid outlet conduit 60 of the extraction vessel 20 is fitted in the bottom plate 58. An extractor outlet valve 61, which can be a ball valve, is operationally coupled to the liquid outlet conduit 60. A quick-connect connector member 62 is secured to the lower end of the liquid outlet conduit 60.

The separator assembly 14 is mounted below the extraction assembly 20 in fluid communication therewith. The separator assembly 14 comprises a hollow separator or collector vessel 70 enclosed in a separator vessel jacket 72. An annular space is formed between exterior of the separator vessel 70 and interior the separator vessel jacket 72. The annular space can be between 0.5-1.0 inch around the circumference of the separator vessel 70 and the separator vessel jacket. Heated water is circulated in the annular space to heat the separator vessel and speed the conversion of solvent from liquid to gas along the flow line.

The separator vessel has an open top 71 and a closed bottom 73. A separator vessel cap 74 is detachably engageable with the open top 71 of the separator vessel 70. The separator vessel cap 74 sealingly closes the open top 71. The separator vessel cap 74 carries a separator connector conduit 75, which is configured for sealing engagement with the connector member 62 of the bottom cup 50.

A thermal probe member 76 is coupled to the separator vessel cap 74, extending into the interior of the separator vessel 70. A gas outlet conduit 77 is mounted on the separator vessel cap 74 in fluid communication with the separator vessel 70. The gas outlet conduit 77 is provided with a pressure gauge 78 and a gas outlet valve 79. The gas outlet conduit 77 carries a male quick-disconnect member 80. The gas outlet conduit 77 is operationally connected to the solvent recovery assembly 18 via a return line 100.

The separator vessel cap 74 is secured to the separator vessel 70 using a tri-clamp 81, which is similar to the clamps 30 and 52 described above. The clamp 81 ensures tight sealing engagement between the periphery of the separator vessel cap 74 and the separator vessel 70. A resilient gasket 82 is sandwiched between the separator vessel cap 74 and the open top of the separator vessel 70 to further ensure a fluid-tight seal therebetween.

The expansion filter assembly 16 comprises a hollow cylindrical expansion filter vessel 84 enclosed in a filter thermal jacket 86, which similarly to the separator vessel jacket 72, is spaced from the wall of the expansion filter vessel 84 by a distance of 0.5-1 inch to allow warm water circulation in the created annular space. An open top 88 of the expansion filter vessel 84 is configured for detachable engagement with a cover plate 89, which carries a filter 90. A tri-clamp 92 secures the cover plate 89 to the open top 88. A flexible gasket 94 ensures a fluid-tight engagement. The filter 90 can be a sintered metal filter. The filter 90 is placed on the outlet side of the expansion filter member to further filter out any impurities or solid material, which may be carried by a flow of gas into a recirculation pump 108, as will be described in more detail hereinafter.

A collection cup 91 is detachably secured to the bottom of the expansion filter vessel 84 with the help of a tri-clamp 93. A perforated filter gasket 95 is fitted between the bottom of the expansion filter vessel 84 and the collection cup 91.

A connector conduit 96 connects the expansion filter vessel 84 with the separator vessel 70. A pressure gauge 98 is provided on the connector conduit 96 for measuring gas pressure in the connector conduit 96. An elongated tube 102 is removably inserted in the expansion filter vessel 84 to allow the gas to travel to the bottom of the expansion filter vessel. A quick-connect fixture 104 is secured on an upper end of the tube 102 for easy connection to gas supply.

A gas booster pump 108 is operationally connected to the connector conduit 96. The gaseous material exiting the expansion filter member 86 is forced to move to the extractor assembly 12 with the assistance of the gas booster pump 108. A gas bottle or gas tank 159 is mounted between the gas booster pump 108 and the extraction assembly 12.

The support assembly 19 comprises an upright stand 120 having a frame-like structure. A pair of base members 122 and 124 is secured in a spaced-apart parallel relationship by a cross bar 126. The base members 122, 124 are designed to rest on a horizontal surface in a work shop, laboratory, or similar space. Upright supports 128 and 130 extend upwardly from the base members 122, 124, respectively, at right angles to the axes of the horizontal base members 122, 124 being secure thereto by bolts 129, 131. A plurality of leveling feet 132 is provided on the bottom of the base members 122, 124 to help maintain the upright support stand 19 on the floor.

Spaced-apart parallel cross members 136, 138 extend between the upright members 128 and 130, further ensuring stability of the support assembly 19. The cross member 138 carries a Y-shaped upper yoke 140, which extends horizontally from the cross member 138 transversely to a longitudinal axis of the cross member 138. The yoke 140 is configured to engage the extraction vessel 20 between the clamps 30 and 52, suspending the extraction vessel 20 on the support stand 120.

A pair of bottom support bars 142, 142 is secured in a spaced-apart parallel relationship to each other and attached to the cross member 136. The bottom support bars 142, 144 extend transversely to a longitudinal axis of the cross member 136. The bottom plate 58 of the bottom cup 50 rests on the bottom support bars 142, 144 when the extraction assembly is mounted on the stand 120. As can be seen in FIG. 1, the extractor assembly 14 is suspended from the bottom support bars 142, 144.

The support assembly 19 also supports a temperature monitor unit 150 for the thermal probe 76 of the separator vessel 20. The temperature monitor unit 138 forms a part of the separator assembly 13. The temperature monitor unit 138 is provided with a temperature indicator 152, which allows visual determination of the thermal conditions inside the separator vessel 70.

The solvent recovery assembly 18 comprises a source of solvent (a gas tank 159) and a gas recovery/control unit 160, as well as associated connected hoses, or lines. On the inlet side, the gas recovery/control unit 160 is connected to the gas return line 162; on the outlet side, to the gas tank 159 via a gas conduit 164. The gas recovery/control unit 160 contains a recovery pump having a pressure indicator 166. A condenser is provided in the gas recovery/control unit for condensing gas evacuated from the separator vessel 70. The condenser has a monitor 168 on the face of the gas recovery/control unit 160.

The gas tank 159 contains a hydrocarbon solvent, such as propane or butane. The gas tank 159 is operationally connected, on the outlet side, to the manually operated gas inlet valve 43 of the extraction assembly 12 via a liquid gas line 170. Liquid gas (such as, for instance, propane) exits the gas tank 159 to act as a solvent for the oil extraction process and re-enters the gas tank 519 as recovered condensed gas.

The temperature of the solvent in the system is regulated by a heat exchanger or computer-based temperature control assembly 200, which regulates delivery and release of the solvent into the extraction assembly 12. The temperature control assembly 200 comprises a cooling device 202 operationally connected to an injector coil member 204, a control valve 206, and a temperature sensor 208 operationally connected to a computer unit 216. The cooling device 202 may be mounted exteriorly to a building, where the apparatus 10 is located if the building is not zoned for hazardous operation. The injection coil member 204 is jacketed in a thermal jacket 210, allowing the user to run the chilled liquid around the outside of a hollow inner tube.

A delivery line 212 runs between the cooling device 202 and the injection coil member 204. The control valve 206 regulates the flow of cooling agent from the cooling device 202 to the injection coil member 204. The gas from the gas tank 159 is cooled when it runs through the injection coil member 204 before entering the liquid gas line 170. The temperature sensor 208 is operationally connected to the computer unit 216, delivering information to the computer unit on the temperature of the solvent entering the extraction vessel 20.

The computer processes the data from the sensor and regulates the operation of the cooling device 202, activating it when necessary to bring the temperature of the solvent to within the desired range of between 25-degrees Fahrenheit and 30-degrees Fahrenheit. As a result, the user can regulate the delivery of the pre-determined temperature hydrocarbon solvent into the extraction vessel 20.

Liquid solvent from the gas tank 159 is drawn through the chilled inner tube of the injection coil member 204 by creating a lower pressure area. The overall temperature of the liquid solvent is lowered, allowing it to be more efficient in the extraction process. The cooling medium is recirculated back to the cooling device 202 via a coolant return line 218 connecting the injection coil member 204 and the cooling device 202.

It is envisioned that the solvent temperature of between 25-degrees Fahrenheit and 30-degrees Fahrenheit is beneficial for optimizing the extraction process in the extraction vessel 20 in many applications. The temperature regulating assembly facilitates recovery of more liquid within a shorter period of time. More oil can be extracted, while lower temperature of the extraction process ultimately saves energy.

Figure 3:
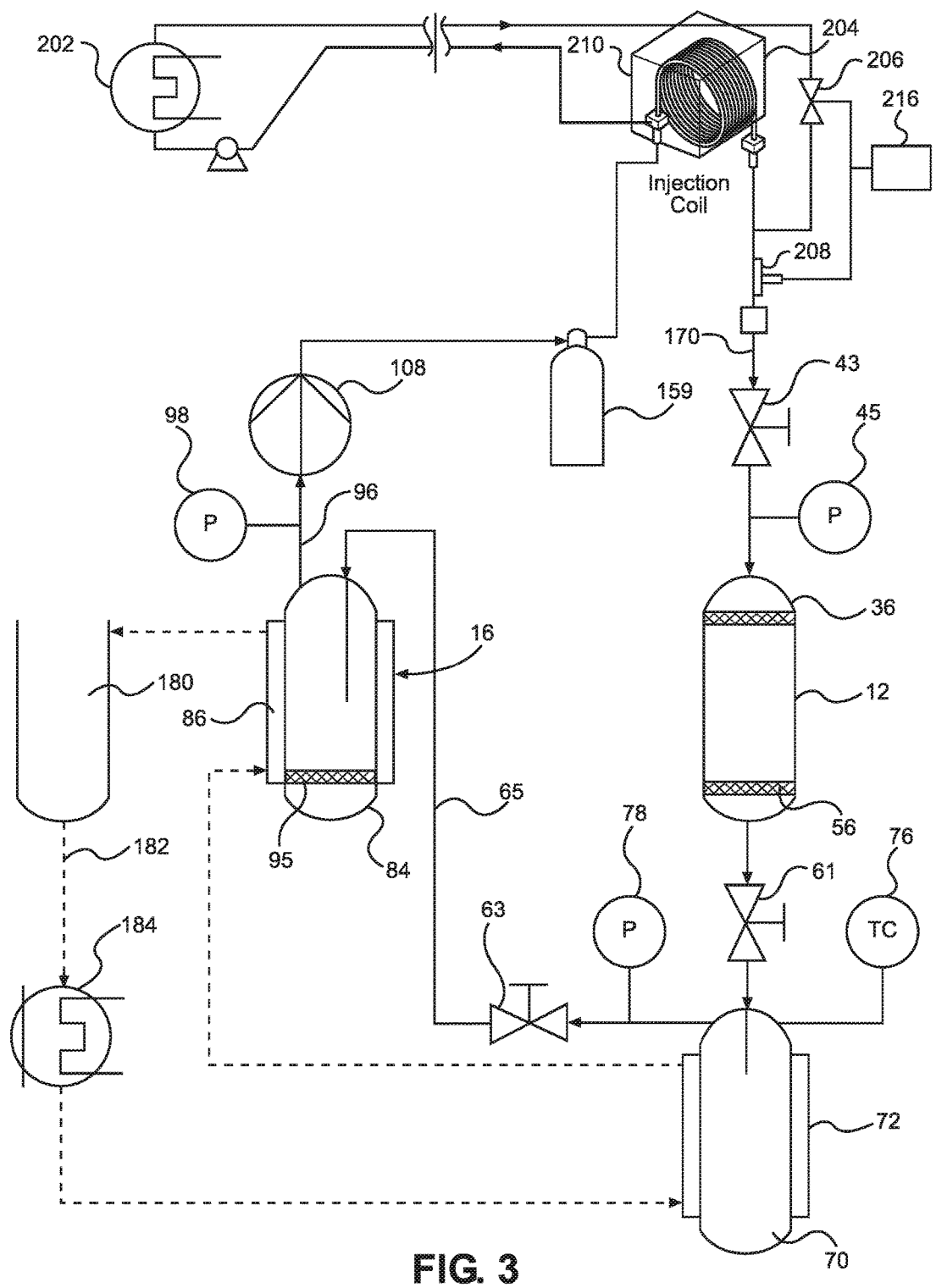
FIG. 3 is a schematic flowchart of the extraction system of the present invention.

In FIG. 3, solid lines designate gas lines and phantom lines designate water lines. In operation, the user removes the high-pressure clamp 30 connecting the top cup 26 to the extraction vessel 20. The user then loads the organic plant material into the extraction vessel 20 and reattaches the top cup 26 to the extractor vessel 20 with the high-pressure clamp 30. The user then manually opens the gas inlet valve 43 and extractor outlet valve 61. The user also attaches the vacuum hose 162 to the gas inlet valve 43.

A predetermined amount of water from a water reservoir 180 is delivered via a water hose 182 into a water heater/cooler 184. Heated water is then transferred to the jacket 72 of the separator vessel 70 and to the jacket 86 of the expansion filter vessel 84.

Next, the user turns on the recycling pump inside the gas recovery/control unit 160 and allows the gas recovery/control unit 160 to pull a vacuum on the extractor vessel 20 and the separator vessel 70. Once vacuum has bene reached, as evident from monitoring the pressure indicator 166, the valves 43 and 16 are closed. The hose 170 can now be disconnected from the recycling pump and connected to the liquid port on the gas tank 159.

The liquid port on the gas tank 159 is opened, and the gas inlet valve 43 is also slowly opened. This will allow the solvent (such as, for instance, propane) from gas tank 159 to enter the extraction vessel 20. The temperature control assembly 200 regulates the temperature of the solvent entering the extraction vessel 20. Solvent permeates the plant material or biomass that was deposited into the extraction vessel 20, and removes the desired constituents. The soak time and pressure will vary depending on the solvent used.

The solvent remains fluid under pressure contained within the extraction vessel 20 between the valves 43 and 61. When the valve 61 is opened, the pressure forces the liquid solvent through the silk screen 57 and the perforated gasket 56 into the separator vessel 70. The pressure gauges should reflect pressure equalizing shortly after the valve 61 is manually opened.

The extract pools at the bottom of the separator vessel 70, and the solvent begins converting into vapor. Applying heat to the water inside the jacket 72 speeds the vaporization process. The valve 63 on the outlet side of the separator assembly 14 is then manually opened, which releases pressurized solvent into the expansion filter via the connecting gas line 65.

The top connector conduit 96 on the expansion filter vessel 84 receives solvent from the separator vessel 70. The vaporized gas descends to the bottom of the expansion filter vessel 84, where it is forced through a molecular sieve 95 before being drawn out by the recovery pump 108. The recovery pump 108 ensures that 99% of the gas is recovered, minimizing exposure to flammable solvents.

Pressure on the outlet side of the expansion filter is monitored by the valve 98. Applying heat to the expansion filter 84 via the filter thermal jacket 86 speeds the process.

The solvent vapor exits the expansion filter vessel 84 and is drawn into the inlet side of the recovery pump via a gas line 67. Before entering the recovery pump 108, the vapor passes through a desiccant filter 95 and spot glass 91 connected to the recovery pump inlet. In the system of the present invention, the expansion filter vessel 84 uses a molecular sieve to filter the vaporized gas solvent. The extraction vessel 20 uses pressure to filter the liquid solvent using a silk filter. The separator vessel 70 converts the liquid solvent to pressurized gas, leaving the extract in liquid form.

The scrubbed solvent vapor is drawn into the recovery pump 108 in pulses and stabilizes in the internal compressor. The solvent is then released from the discharge side of the recovery pump 108 back into the gas tank 159.

The gas recovery/control unit 96 recovers that gas and pumps it back into the gas tank or recovery cylinder 159. The thermal probe 76 in the separator vessel 70 is attached to the thermostat 150, allowing the user to monitor the temperature in the separator vessel 70 during this process. Once all of the gas has been removed from the separator vessel 70, the user closes the extractor outlet valve 61. The separator vessel 70 is disconnected from the extractor assembly 12 using the quick-disconnect connector below the extractor vessel 20.

Once the separator vessel 70 is detached from the extractor vessel 20, the user can remove the high-pressure clamp that is connecting the separator cap 74 to the separator vessel. The extracted oil can now be removed from the separator vessel. The process can then be repeated by loading a new batch of plant material into the extraction vessel 20, forcing the solvent through the plant material and separating the extracted oil from the plant material.

In one aspect of the invention, both the separator vessel 70 and the extraction vessel 20 hold equal amounts of volume. The volume may be between 5-liters to 10-liters. The separator vessel 70 has a fixed thermal water jacket 90 that allows hot or cold water to be circulated around the separator, when required. In an alternative embodiment, the water heater is replaced with an electric heater. Propane gas can be substituted with other hydrocarbon solvent if desired. A variety of natural organic raw materials can be processed using the apparatus and method of this invention.

Many other changes and modifications can be made in the present invention without departing from the spirit thereof. I therefore pray that my rights to the present invention be limited only by the scope of the appended claims.

I claim:

1. An apparatus for extracting oil from oil-bearing plant material, comprising:
    (i) a source of hydrocarbon solvent;
    (ii) an extraction assembly having an extraction vessel receiving the oil-bearing plant material, a separator assembly operationally connected to the extraction assembly, the separator assembly separating the hydrocarbon solvent from oil extracted in the extraction vessel;
    (iii) a computer-based temperature control assembly for regulating delivery of the hydrocarbon solvent to the extraction assembly;
    (iv) an expansion filter assembly mounted downstream from the separator assembly and configured to filter vaporized hydrocarbon solvent; and
    (v) a solvent recovery assembly operationally connected to the expansion filter assembly and to the source of the hydrocarbon solvent, the solvent recovery assembly comprising a gas recovery/control unit having a solvent recycling pump.

2. The apparatus of claim 1, wherein the temperature control assembly comprises a cooling device, a thermally jacketed injection coil member operationally mounted between the source of the hydrocarbon solvent and the cooling device, and a temperature sensor operationally connected to a computer unit.

3. The apparatus of claim 2, wherein the temperature sensor is mounted between the extraction assembly and the injection coil device.

4. The apparatus of claim 2, the temperature regulating assembly further comprising a control valve mounted between the cooling device and the injection coil member.

5. The apparatus of claim 1, said extraction assembly comprising an upright extraction vessel having a top perforated gasket and a bottom perforated gasket, and further comprising a filter mounted downstream from the bottom perforated gasket.

6. The apparatus of claim 1, wherein the temperature control assembly maintains the temperature of the hydrocarbon solvent delivered to the extraction vessel within a range of between 25-degrees Fahrenheit and 30-degrees Fahrenheit.

7. An apparatus for extracting oil from oil-bearing plant material, comprising:
    (i) a source of hydrocarbon solvent;
    (ii) an extraction assembly having an extraction vessel receiving the oil-bearing plant material, a separator assembly operationally connected to the extraction assembly, the separator assembly separating the hydrocarbon solvent from oil extracted in the extraction vessel;
    (iii) a computer-based temperature control assembly for regulating delivery of the hydrocarbon solvent to the extraction assembly, the temperature control assembly comprising a computer unit, a cooling device, a thermally jacketed injection coil member operationally mounted between the source of the hydrocarbon solvent and the cooling device, a temperature sensor mounted between the extraction assembly and the injection coil device, and a control valve mounted between the cooling device and the injection coil member;
    (iv) an expansion filter assembly mounted downstream from the separator assembly and configured to filter vaporized hydrocarbon solvent; and
    (v) a solvent recovery assembly operationally connected to the expansion filter assembly and to the source of the hydrocarbon solvent, the solvent recovery assembly comprising a gas recovery/control unit having a solvent recycling pump.

8. The apparatus of claim 7, said extraction assembly comprising an upright extraction vessel having a top perforated gasket and a bottom perforated gasket, and further comprising a filter mounted downstream from the bottom perforated gasket.

9. The apparatus of claim 7, wherein the temperature control assembly maintains the temperature of the hydrocarbon solvent delivered to the extraction vessel within a range of between 25-degrees Fahrenheit and 30-degrees Fahrenheit.

10. An apparatus for extracting oil from oil-bearing plant material, comprising:
    (i) a source of hydrocarbon solvent comprising a gas tank retaining the hydrocarbon solvent;
    (ii) an extraction assembly having an extraction vessel receiving the oil-bearing plant material, the extraction assembly comprising a tubular hollow extraction vessel having an open top and an open bottom, a top cup detachably engageable with the open top and a bottom cup detachably engageable with the open bottom of the extraction vessel, a top perforated gasket sandwiched between the extraction vessel and the top cup, a bottom perforated gasket, and a fine filter sandwiched between the extraction vessel and the bottom cup;
    (iii) a separator assembly operationally connected to the extraction assembly, the separator assembly separating the hydrocarbon solvent from oil extracted in the extraction vessel, the separator assembly comprising a hollow separator vessel having an open top and a closed bottom, a separator thermal jacket enveloping the separator vessel and receiving heating medium therein, and a separator vessel cap detachably sealingly engageable with the open top of the separator vessel;
    (iv) a computer-based temperature control assembly for regulating delivery of the hydrocarbon solvent to the extraction assembly, the temperature control assembly comprising a computer unit, a cooling device, a thermally jacketed injection coil member operationally mounted between the source of the hydrocarbon solvent and the cooling device, a temperature sensor mounted between the extraction assembly and the injection coil device, and a control valve mounted between the cooling device and the injection coil member;
    (v) an expansion filter assembly operationally connected to the separator assembly and positioned downstream of the extraction filter assembly, the expansion filter assembly comprising an expansion filter vessel enveloped in a filter thermal jacket, the filter thermal jacket being configured to receive a heating/cooling medium therein;
    (vi) an upright stand supporting the extraction vessel, the separator vessel and the expansion filter vessel; and
    (vii) a solvent recovery assembly operationally connected to the expansion filter assembly and the source of hydrocarbon solvent, the solvent recovery assembly comprising gas recovery/control unit having a re-circulating gas pump and a condenser unit, the gas recovery/control unit being mounted between the expansion filter vessel and the gas tank.

11. The apparatus of claim 10, wherein the temperature control assembly maintains the temperature of the hydrocarbon solvent delivered to the extraction vessel within a range of between 25-degrees Fahrenheit and 30-degrees Fahrenheit.

* * * * *